(No Model.) 2 Sheets—Sheet 1.

E. A. PECK.
HARVESTER.

No. 356,956. Patented Feb. 1, 1887.

Witnesses.
Will R. Omohundro
Otto F. Nyberg

Inventor:
Ezra A. Peck
By Edward Mack
Attys

N. PETERS, Photo-Lithographer, Washington, D. C.

(No Model.) 2 Sheets—Sheet 2.
E. A. PECK.
HARVESTER.
No. 356,956. Patented Feb. 1, 1887.
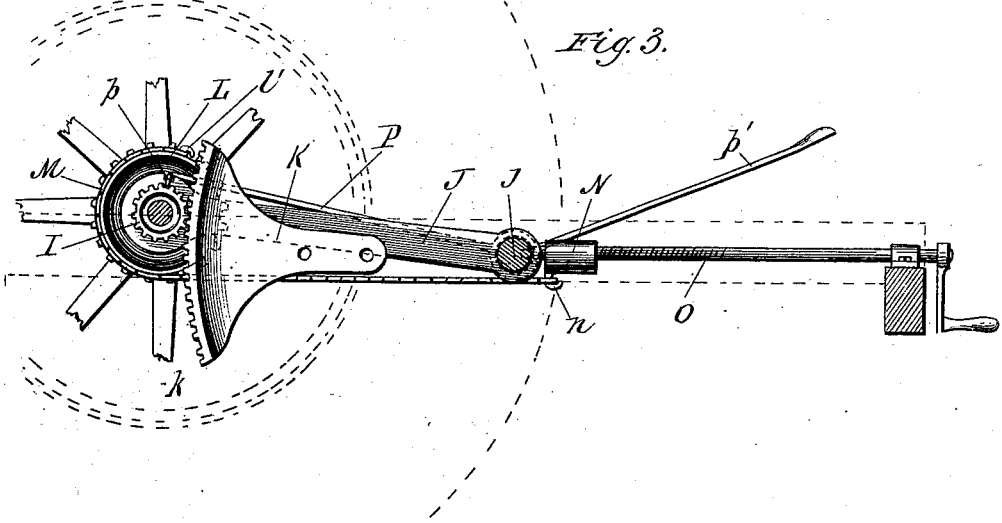
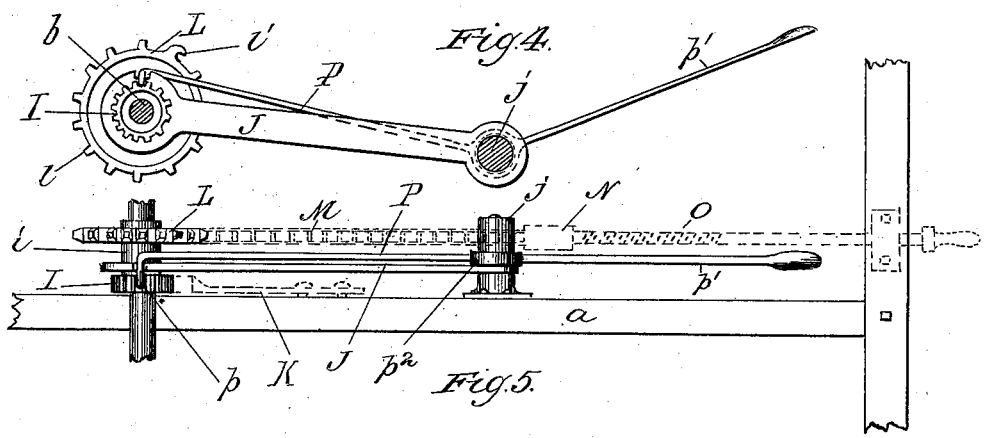
Witnesses.
Will. P. Omohundro
Otto Fr. Nyberg
Inventor
Ezra A Peck
By Coburn & Thacher
Atty's

UNITED STATES PATENT OFFICE.

EZRA A. PECK, OF PLANO, ILLINOIS, ASSIGNOR TO THE PLANO MANUFACTURING COMPANY, OF SAME PLACE.

HARVESTER.

SPECIFICATION forming part of Letters Patent No. 356,956, dated February 1, 1887.

Application filed May 27, 1885. Serial No. 166,879. (No model.)

*To all whom it may concern:*

Be it known that I, EZRA A. PECK, a citizen of the United States, and residing at Plano, in the county of Kendall and State of Illinois, have invented certain new and useful Improvements in Harvesters, which are fully set forth in the following specification, reference being had to the accompanying drawings, in which—

Figure 1:
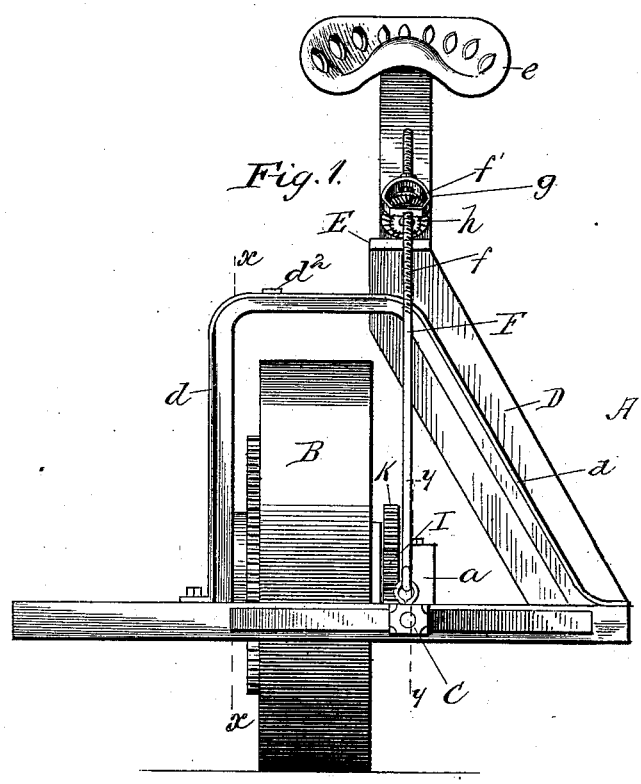
Figure 2:
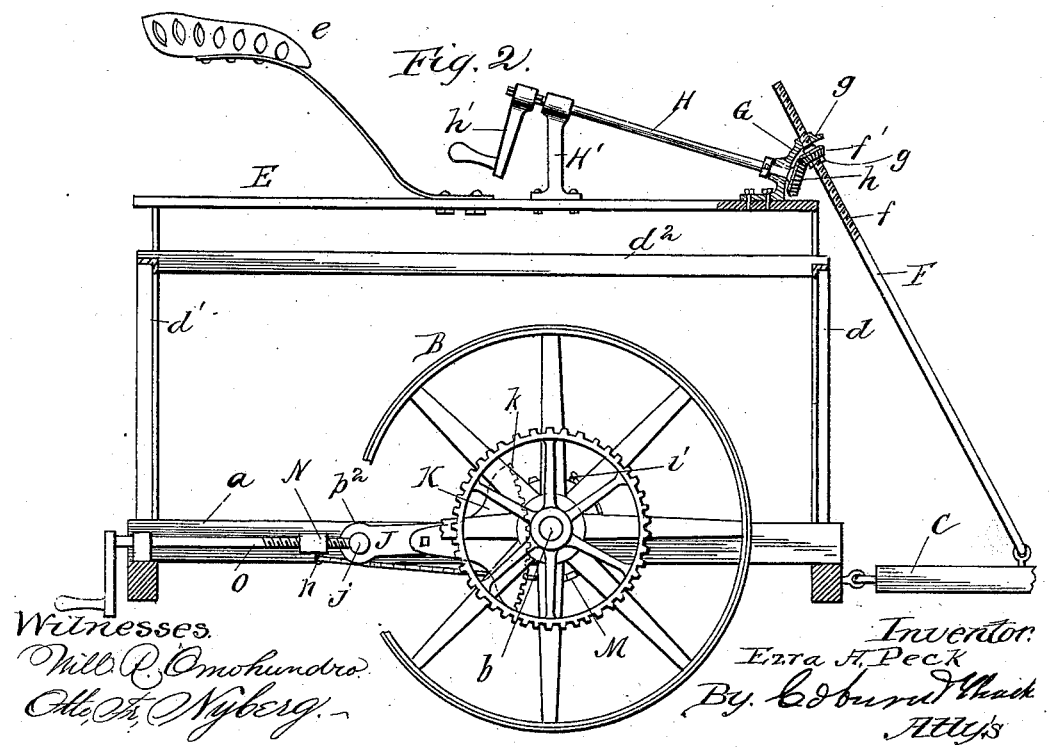

Figure 1 represents a front elevation of the main wheel and a portion of the frame of a harvester embodying my improvements; Fig. 2, a section of the same, taken on the line $x\ x$, Fig. 1, a portion of the wheel being broken away; Fig. 3, a section of the same, taken on the line $v\ v$, Fig. 1, with the machine reversed; Fig. 4, a detail elevation showing the locking device for the axle-pinion, and Fig. 5 a plan view of the devices shown in Fig. 3.

The figures of the drawings are on two scales, the first and second being on one scale, and the third, fourth, and fifth on another and enlarged scale.

My invention relates to harvesters, and especially to machines which are intended to be provided with automatic binders, though my present improvements do not relate to the binding mechanism, and are not intended to be restricted to machines which have self-binders.

The improvements relate to certain parts of the frame of the machine, to mechanism for raising and lowering the frame on the main wheel, and to devices for tilting said frame.

I will proceed to describe in detail the construction and operation of a machine in which I have practically embodied my invention in one way, and will then point out definitely in the claims the special improvements which I believe to be new and wish to protect by Letters Patent.

As these improvements relate only to certain parts of the machine, I have shown in the drawings only so much of a harvester as is necessary to understand the construction and operation of the devices, by means of which I have embodied the present invention, it being understood that in features not shown the machine may be of any ordinary and well-known construction.

In the drawings, $a$ represents a portion of the main or platform frame of the machine, B the main or supporting-wheel, and C the tongue or pole, which is shown hinged to the main sill of the frame. On this frame is the usual elevator or A-frame, D, extending over the wheel. In general features this elevator-frame is of ordinary construction. It is, however, much lower than the usual elevator-frame, and the main wheel I intend to make considerably less in diameter than is now customary. The front upright, $d$, of this frame is made of a single piece of angle-iron, bent in the required shape, as shown in Fig. 1 of the drawings, and the rear upright, $d'$, may also be of angle-iron, if desired, or may be constructed in the usual way. On these uprights is the upper platform or frame-work, $d^2$. This frame may also be of angle-iron, or of wood, as desired.

The seat-bar E is arranged just above the inner portion of the top deck, and directly in line or in the same plane with the pole, as shown in Fig. 1 of the drawings, from which it will appear that the grain, when elevated, passes directly under the seat-support. The driver's seat $e$ is attached to the support in any manner. A rod, F, is linked at its lower end to the pole, a little distance in front of the hinge of the latter, and extends upward to the front end of the seat-bar, where it passes through a bearing or guide-opening, $g$, in the bracket G, mounted on the bar. The upper end of the link-rod is provided with a screw-thread, $f$, and therefore the opening in the bracket is not intended to fit tightly the rod. A loose nut, $f'$, is applied to the threaded section of the link-rod, being arranged below the bracket, and being provided with a bevel-pinion. A shaft, H, preferably inclined, as shown in Fig. 2 of the drawings, is mounted at its front lower end in the bracket G and at the other end on a standard, H'. At the front end of this shaft is a bevel-pinion, $h$, which is arranged to engage with the screw-nut pinion, and the rear end of the shaft is provided with a crank, $h'$, in easy reach of the driver. It will be seen that by turning this shaft in one direction or the other the nut-pinion will be rotated, so as to either draw up or thrust down the link-rod, thereby tilting the main frame. The arrangement of the seat-bar in line with the pole enables me to arrange and mount the tilting devices on the bar, as described.

The main wheel B is arranged, as usual, between two cross-sills, a, of the main frame, and is mounted on the usual axle, b. Pinions I are also mounted on the axle—one on each side of the wheel—and each is provided with a sleeve or boss, i, surrounding the axle. The axle itself is mounted in swinging radius-arms J, which at their inner ends surround the sleeves i, and at their outer ends are mounted on stud-pins j, fastened to the inside of the cross-sills. The bearings of these arms being loose at both ends, they will of course swing freely to permit the frame to be raised and lowered on the wheel. Sector-plates K are fastened to the inside of each cross-sill, being provided with toothed segments k, arranged in the arc of a circle the center of which is the stud-pin about which the swinging arms vibrate. These sector-plates are arranged to engage with the pinions I, on each side of the wheel, which pinions are fast to the axle. A sprocket or chain wheel, L, is secured to the sleeve of one of the pinions, being either made in one piece therewith or mounted thereon, and fastened in any suitable way. This wheel, in addition to the sprockets or teeth l, is also provided with a hook, l', which serves as a means for the attachment of one end of a chain, M. This chain passes around the wheel in front and toward the rear of the machine, and is attached at its other end to a loose nut, N, which is provided with a hook, m, for this purpose.

A shaft, O, is mounted in a suitable bearing on the rear sill of the main frame, from which it extends forward, and is mounted in front in a suitable bearing in or upon the stud-pin j, as shown in Figs. 3 and 5 of the drawings. This shaft is threaded and runs through the nut N. It is provided with a crank at its rear end, by means of which it is rotated, and it will be seen that its rotation will move the nut back and forth, thereby adjusting the main frame up and down, for it will be seen that if the nut end is drawn back the wheel L will be turned forward, thereby rotating the pinion I, to which it is connected in such manner that by reason of its engaging with the sector-plate, which is attached to the main frame, the latter will be lifted, the parts being arranged as shown in Figs. 3 and 5 of the drawings. If, on the other hand, this shaft is rotated so as to move this nut forward, the frame will drop of its own weight.

The device for locking the sprocket-wheel being a screw-shaft and nut forms in itself a sufficient lock to hold the frame in any position in which it may be adjusted; but for the purpose of preventing the disarrangement in case the wheel drops in a ditch or furrow and brings the frame to the ground I provide an additional locking device, which will prevent the disarrangement of the parts, either under the condition named above or any other like circumstance. This device is a catch, P, which is mounted loosely on the stud-pin j and extends forward to the axle, where it is provided with a bent end or finger, p, turned outward, so as to drop between the teeth of the pinion on the axle, the swinging arm J being provided with a notch at this point to permit the finger of the catch to drop low enough to engage with the pinion, as shown in Figs. 4 and 5 of the drawings. Obviously when this catch engages with the pinion, as shown in the figures named, it effectually stops the rotation of the pinion, and consequently any movement of the frame either up or down. As a convenient means for operating this catch, I provide a rearwardly-extending handle, $p'$, fastened to the ring or band $p^2$, by which the catch is mounted on the stud-pin, and extending thence rearward and preferably inclining upward, as shown in Fig. 4 of the drawings. Obviously, by means of this lever the catch may be vibrated to engage and disengage with the pinion. The catch, its band, and lever may be made all in one piece, as illustrated in the drawings, if desired. This catch effectually prevents the derangement of the frame and main wheel, even if the latter should drop low enough to cause the frame to strike the ground.

It is not necessary to provide the raising and lowering devices and catches on both sides of the wheel, and I preferably arrange these devices on the inside of the latter, as shown in Fig. 1 of the drawings. The relative arrangement of these parts is shown in Figs. 3 and 5 of the drawings; but this is a matter of convenience, and may be changed without materially modifying the operation of the devices.

I do not wish to be understood as limiting myself to the precise construction and arrangement of the devices herein described and shown, for obviously many mechanical changes may be made without departing from the controlling features of my invention.

It will be noticed in regard to the lifting device that there is a straight pull on the lifting-chain, and only so much movement is necessary in the latter as will raise the frame to the distance required, where it is held by the very device which makes the pull on the chain.

In another application, filed simultaneously with this, for an improvement in grain-binders, I have shown the frames and some other parts that are herein shown and described. These features, however, as special constructions, constitute no part of the invention of the said application, but are made the subject-matter of this case, as stated above.

Having thus described my invention, what I claim as new, and desire to secure by Letters Patent, is—

1. In a harvester, the main frame, in combination with the upright section d of the elevator-frame, consisting of angle-iron bent to the shape required, substantially as and for the purposes set forth.

2. The main frame, in combination with the pole hinged thereto, the link-rod F, threaded at its upper end, the seat bar or support arranged in line with the pole, the bracket G, provided with bearings for both the rod F and shaft H and mounted on the seat-bar, the nut-pinion $f'$, and the shaft H, mounted on the seat-support and provided with a pinion, $h$, engaging with the nut-pinion, substantially as and for the purposes set forth.

3. The main wheel and axle, in combination with the main frame adjustable vertically thereon, the chain-wheel mounted on the axle, the lifting-chain connected to said axle at one end, the screw-nut to which the chain is connected at its other end, the screw-shaft for adjusting said nut, the frame-sill $a$, the stud-pin $j$ on said sill, provided with a bearing for said shaft, and the rear sill of the frame supporting the rear bearing of the screw-shaft, substantially as and for the purposes specified.

4. The main frame, in combination with the toothed sector-plates fastened thereto, the swinging radius-arms, the main-wheel axle, the pinions mounted thereon, the lever-catch P, provided with handle $p'$, and a device for operating the raising and lowering mechanism arranged near the said handle, substantially as and for the purposes set forth.

EZRA A. PECK.

Witnesses:
W. H. JONES,
LEONARD WATSON.